United States Patent
Lee et al.

(10) Patent No.: US 10,319,338 B2
(45) Date of Patent: Jun. 11, 2019

(54) ELECTRONIC DEVICE AND METHOD OF EXTRACTING COLOR IN ELECTRONIC DEVICE

(71) Applicant: Samsung Electronics Co., Ltd., Suwon-si, Gyeonggi-do (KR)

(72) Inventors: Seung-Myung Lee, Seoul (KR); Dae-Hee Kim, Yongin-si (KR); Seung-Hwan Jeong, Yongin-si (KR); Dae-Won Kim, Seoul (KR); Jee-Yeun Wang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/611,681

(22) Filed: Feb. 2, 2015

(65) Prior Publication Data

US 2015/0228249 A1 Aug. 13, 2015

(30) Foreign Application Priority Data

Feb. 13, 2014 (KR) ........................ 10-2014-0016946

(51) Int. Cl.
*G09G 5/02* (2006.01)
*G09G 3/20* (2006.01)
*G06T 11/00* (2006.01)
*G06T 7/90* (2017.01)
*G06T 7/194* (2017.01)

(52) U.S. Cl.
CPC ............... *G09G 5/02* (2013.01); *G06T 7/194* (2017.01); *G06T 7/90* (2017.01); *G06T 11/001* (2013.01); *G09G 3/2003* (2013.01); *G06T 2200/24* (2013.01); *G06T 2207/10024* (2013.01); *G09G 2320/0666* (2013.01)

(58) Field of Classification Search
CPC ............... G09G 5/02; G09G 3/2003; G09G 2320/0666; G06T 7/408; G06T 11/001; G06T 2207/10024; G06T 2200/24; G06T 7/194; G06T 7/90
USPC ...................................................... 345/593
See application file for complete search history.

(56) References Cited

U.S. PATENT DOCUMENTS

| | | | |
|---|---|---|---|
| 8,264,499 B1 | 9/2012 | Landry et al. | |
| 8,345,061 B1 | 1/2013 | Landry et al. | |
| 2008/0232686 A1* | 9/2008 | Ohashi | G06F 17/3025 382/168 |
| 2009/0005621 A1 | 1/2009 | Hassan et al. | |
| 2009/0015593 A1 | 1/2009 | Kang et al. | |
| 2010/0053201 A1* | 3/2010 | Klassen | G06T 11/001 345/601 |
| 2010/0107120 A1* | 4/2010 | Sareen | G06F 3/04845 715/821 |
| 2011/0252344 A1 | 10/2011 | Van Os | |

(Continued)

FOREIGN PATENT DOCUMENTS

JP 2011-182001 A 9/2011

*Primary Examiner* — King Y Poon
*Assistant Examiner* — Vincent Peren
(74) *Attorney, Agent, or Firm* — Jefferson IP Law, LLP

(57) ABSTRACT

An electronic device and a method of extracting a color in the electronic device are provided. The electronic device includes a display unit configured to display an image and a controller configured to extract at least one color value from the image, and to extract a color value satisfying a range of color deviation from the extracted color values.

15 Claims, 7 Drawing Sheets

(56) References Cited

U.S. PATENT DOCUMENTS

| | | | |
|---|---|---|---|
| 2012/0313962 A1* | 12/2012 | Hsu | G06F 3/04817 345/593 |
| 2014/0002506 A1* | 1/2014 | Li | G06F 8/38 345/666 |
| 2014/0037200 A1 | 2/2014 | Phillips et al. | |
| 2014/0075324 A1* | 3/2014 | Howard | H04L 12/18 715/738 |
| 2015/0007093 A1* | 1/2015 | Kuscher | G06F 3/0481 715/779 |
| 2015/0113482 A1* | 4/2015 | Breger | G06F 3/04817 715/846 |

* cited by examiner

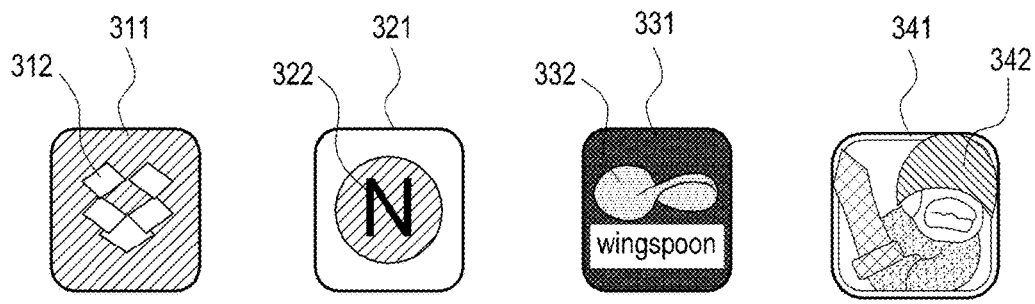
FIG.3A  FIG.3B  FIG.3C  FIG.3D
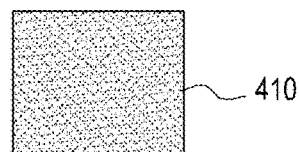
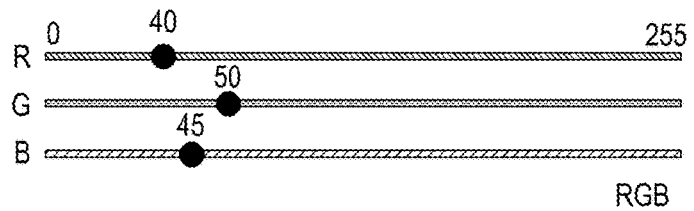
FIG.4
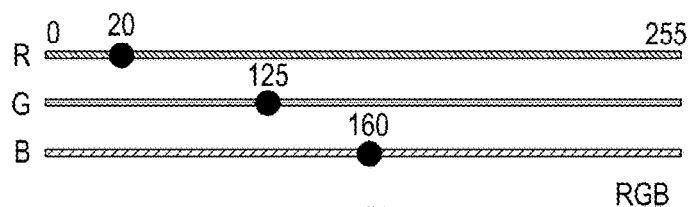
FIG.5

ELECTRONIC DEVICE AND METHOD OF EXTRACTING COLOR IN ELECTRONIC DEVICE

CROSS-REFERENCE TO RELATED APPLICATION(S)

This application claims the benefit under 35 U.S.C. § 119(a) of a Korean patent application filed on Feb. 13, 2014 in the Korean Intellectual Property Office and assigned Serial number 10-2014-0016946, the entire disclosure of which is hereby incorporated by reference.

TECHNICAL FIELD

The present disclosure relates to an electronic device and a method of extracting a color. More particularly, the present disclosure relates to an electronic device and a method of extracting a color in the electronic device, which can extract the most representative and important color, which is more vivid, from an image (e.g., an icon) displaying an application.

BACKGROUND

Electronic devices including computers, smart phones, and the like recently support various application programs (also, referred to as 'applications') and are being developed to display the applications through images (e.g., icons, and the like) in a graphic interface operating system.

In the graphic interface operating system, a color is a design factor having the greatest visual effect and is a visual factor which makes images appear to be different depending on the arrangement of colors. Accordingly, various colors are diversely used in images (e.g., icons) to display a large number of applications.

If various colors of application images are used to display various types of information related to applications, the application related information can be displayed with a sense of unity. In order to use the colors of the application images for the display of the application related information, the colors need to be extracted from the application images.

However, in color extraction methods of the related art, colors are extracted by setting the color value of an entire image to an average value, and therefore, the extracted colors are more cloudy or darker than original colors of the image.

Therefore, a need exists for an electronic device and a method of extracting a color in the electronic device, which can extract the most representative and important color, which is more vivid, from an image (e.g., an icon) displaying an application.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method of extracting a color in the electronic device, which can extract the most representative and important color, which is more vivid, from an image (e.g., an icon) displaying an application.

Another aspect of the present disclosure is to provide an electronic device and a method of extracting a color in the electronic device, which can use the color extracted from the image (e.g., an icon) displaying the application in order to display various types of information associated with the application.

In accordance with an aspect of the present disclosure, an electronic device is provided. The electronic device includes a display unit configured to display an image and a controller configured to extract at least one color value from the image, and to extract a color value satisfying a range of color deviation from the extracted at least one color value.

In accordance with another aspect of the present disclosure, a method of extracting a color in an electronic device is provided. The method includes extracting at least one color value from an image and extracting a color value satisfying a range of color deviation from the extracted at least one color value.

In accordance with another aspect of the present disclosure, a non-transitory computer-readable storage medium for storing a computer program of instructions configured to be readable by at least one processor for instructing the at least one processor to execute a computer process for extracting a color is provided. The program may perform an operation of extracting at least one color value from the image, and an operation of extracting a color value satisfying a range of color deviation from the extracted at least one color value, in an electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, 3C, and 3D illustrate types of application icons according to an embodiment of the present disclosure;

FIG. 4 illustrates a first color extracted from an application icon according to an embodiment of the present disclosure;

FIG. 5 illustrates a second color extracted from an application icon according to an embodiment of the present disclosure;

Throughout the drawings, it should be noted that like reference numbers are used to depict the same or similar elements, features, and structures.

DETAILED DESCRIPTION

Figure 1:
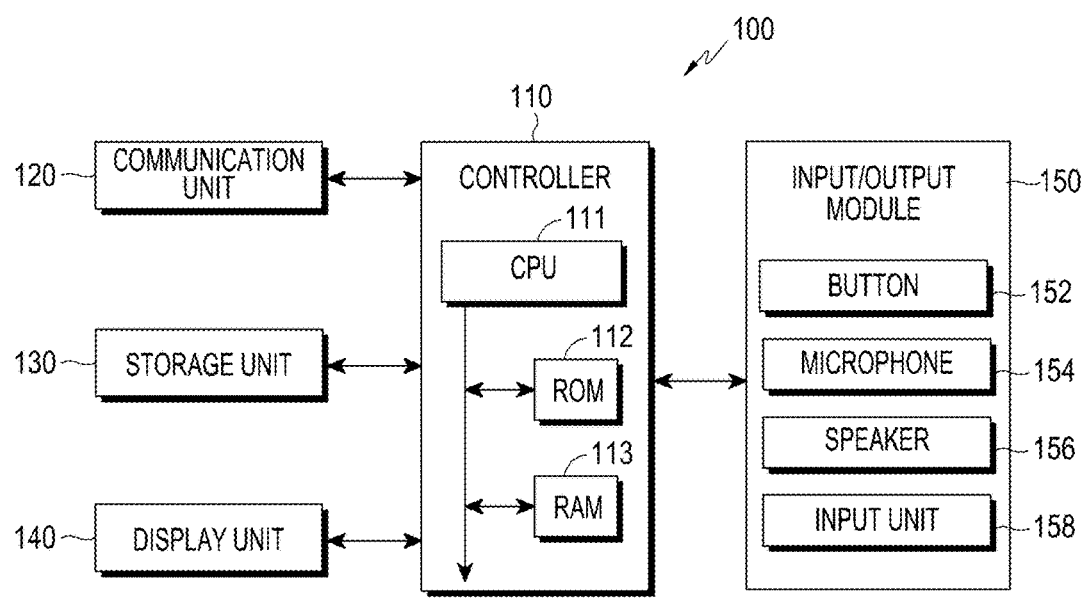
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms used in various embodiments of the present disclosure will first be described in brief, and then, the various embodiments of the present disclosure will be specifically described.

With respect to the terms in the various embodiments of the present disclosure, the general terms which are currently and widely used are selected based on functions of structural elements in the various embodiments of the present disclosure. However, meanings of the terms may be changed according to an inventor's intention, a judicial precedent, appearance of a new technology, and the like. In addition, at a certain case, a term arbitrarily selected by the applicant may be used. In such a case, the meaning of the term will be described at the corresponding part in the description of the present disclosure. Thus, the terms used in various embodiments of the present disclosure should be defined based on the meanings of the terms and the overall contents of the embodiments of the present disclosure instead of simple titles of the terms.

In various embodiments of the present disclosure, when a part "includes" a component element, it does not mean excluding other component elements but it shall be construed that one or more other components can be included unless they are specifically described to the contrary. In addition, the term, such as "unit", "module", or the like, indicates a unit for processing at least a function or an operation, and may be embodied through hardware, software, or a combination hardware and software.

The same reference numerals of each of the drawings may be designated to members performing the same function.

An electronic device according to various embodiments of the present disclosure may be an electronic device capable of displaying an application image, for example, an icon. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, a mobile medical device, a camera, a wearable device (for example, a Head-Mounted-Device (HMD), such as electronic glasses, electronic clothes, an electronic bracelet, an electronic necklace, an electronic appcessory, an electronic tattoo, a smart watch, and the like).

In accordance with various embodiments, the electronic device may correspond to a smart home appliance. The smart home appliance as an example of the electronic device may include at least one of, for example, a Television (TV), a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to various embodiments, the electronic device may include at least one of a navigation device and an in-vehicle infotainment device.

According to various embodiments, the electronic device may include at least one of a part of furniture or a building/structure, an electronic board, an electronic signature receiving device, and a projector. The electronic device according to an embodiment of the present disclosure may correspond to one of the aforementioned various devices or a combination thereof. Further, it will be apparent to those skilled in the art that the electronic device according to the present disclosure is not limited to the above-mentioned devices, and the present disclosure may be applied to any kind of device capable of displaying an application image.

FIG. 1 is a block diagram of an electronic device according to an embodiment of the present disclosure.

Referring to FIG. 1, an electronic device 100 may include a controller 110, a communication unit 120, a storage unit 130, a display unit 140, and an input/output unit 150.

The controller 110 may be a Central Processor Unit (CPU) 111. The controller 110 may include a Digital Signal Processor (DSP, not illustrated), and also may include a Read Only Memory (ROM) 112 storing a control program for controlling the electronic device 100, and a Random Access Memory (RAM) 113 used as a storage area for storing signals or data input from the outside of the electronic device 100 or for tasks performed in the electronic device 100. The CPU 111 may include a single core type CPU, a dual core type CPU, a triple core type CPU, or a quad core type CPU. The CPU 111, the ROM 112, and the RAM 113 may be connected with each other through internal buses. The controller 110 may control the communication unit 120, the storage unit 130, the display unit 140, and the input/output unit 150. For example, the controller 110 may perform a function of controlling overall operations of the electronic device 100 and control a signal flow between the elements.

For example, the controller 110 may perform control operations used for extracting at least one or more color values for an image and extracting color values satisfying a certain color deviation from the extracted color values.

The communication unit 120 may make the electronic device 100 connected with an external device. The external device may include other electronic devices (not illustrated), such as mobile phones (not illustrated), smart phones (not illustrated), tablet PCs, and the like, and a wireless access device 30.

For example, the communication unit 120 may include at least one of a mobile communication module, a Near Field Communication (NFC) module, and Wireless Fidelity (WIFI) module. The mobile communication module 120 may transmit/receive a wireless signal for a voice call, a video call, a Short Message Service (SMS), or a Multimedia Message Service (MMS) to/from other electronic devices (not illustrated) including mobile phones (not illustrated) with phone numbers input to the electronic device 100, smart phones (not illustrated), tablet PCs, and the like through the mobile communication module under the control of the controller 110. Furthermore, the communication unit 120 may transmit/receive an NFC signal to/from other electronic devices through the NFC module. Moreover, at a place where an Access Point (AP), a wireless access device, is disposed, the communication unit 120 may access the Internet through the WIFI module.

The storage unit 130 may store signals or data input/output in correspondence to an operation of the controller 110, the communication unit 120, the display unit 140, and the input/output unit 150 under the control of the controller 110. The storage unit 130 may store a plurality of programs and a plurality of applications for the control of the electronic device 100 or the controller 110, and programs and data for executing various functions including a wireless network access function. Furthermore, the storage unit 130 may store a program, for example an application, for performing color extraction according to an embodiment of the present disclosure.

The term "storage unit" may refer to the ROM 112 within the controller 110, the RAM 113, or a memory card (not illustrated) (e.g., a Secure Digital (SD) card and a memory stick) mounted to the electronic device 100. The storage unit 130 may include a non-volatile memory, a volatile memory, a Hard Disk Drive (HDD), or a Solid State Drive (SSD). The storage unit 130 may be a machine-readable medium, for example a computer-readable medium, and the term 'machine-readable medium' may be defined as a medium for providing data to the machine so that the machine may perform a specific function. The machine-readable medium may be a storage medium. The storage unit 130 may include a non-volatile medium and a volatile medium. All of these media should be of a type that allows commands transferred by the media to be detected by a physical mechanism through which the machine reads the commands. The machine-readable medium may include at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash EPROM, without being limited thereto.

The display unit 140 may be a touch screen, and may provide a graphical user interface to a user. For example, the display unit 140 may receive various gesture inputs, including at least one proximity or touch, through a user's body (e.g., fingers including a thumb) or a touchable input unit 158, for example, a pen. The display unit 140, for example, may be implemented in various types including a resistive type, a capacitive type, an infrared type, or an ultrasonic wave type. The display unit 140 described above may display application icons and a screen for providing application related information to which a color extracted from each of the application icons is applied, under the control of the controller 110 according to an embodiment of the present disclosure.

The input/output unit 150 may include a button 152, a microphone 154, a speaker 156, and an input unit 158. The input/output unit 150 is not limited to those described above, and may be provided with a cursor controller, such as a mouse, a trackball, a joystick, or cursor directional keys, for controlling communication with the controller 110 and a movement of a cursor on the screen 140. One or more buttons 152 may be provided for the electronic device 100, and may provide various input signals according to a push of a user to the controller 110. The microphone 154 may receive an input of a voice or sound involved in various sound sources to generate electric signals under the control of the controller 110. The speaker 156 may output, to the outside of the electronic device 100, sounds corresponding to various signals (e.g., a wireless signal, a broadcast signal, a digital audio file, a digital video file, and the like) received through wireless network access under the control of the controller 110. The input unit 158 may be a device or an object that is inserted into and stored in the electronic device 100 or is separately configured. The input unit 158, when inserted into and stored in the electronic device 100, may be withdrawn or detached from the electronic device 100. The input unit 158 may be an input means, such as a stylus pen (hereinafter, referred to as a pen), through which an input, such as proximity or a touch, can be made to the display unit 140, or a user's finger.

According to an embodiment of the present disclosure, the electronic device may include a display unit that displays an image, and a controller that extracts at least one or more color values from the image, and extracts a color value satisfying a certain color deviation from the extracted color values. According to an embodiment of the present disclosure, the image may be an application icon. According to an embodiment of the present disclosure, the controller may extract at least one or more dominant color values and at least one or more object color values from the image. According to an embodiment of the present disclosure, the controller may select a certain number of color values in a descending order of areas from the at least one or more extracted dominant color values and the at least one or more extracted object color values. According to an embodiment, the color deviation may be a difference between maximum and minimum values of R-, G-, and B-component values. According to an embodiment of the present disclosure, as a difference between maximum and minimum values of R-, G-, and B-component values, the color deviation may be a value of 70. According to an embodiment of the present disclosure, the controller may extract an average color value using the color values when there is no color value satisfying the color deviation. According to an embodiment of the present disclosure, the controller may determine the extracted color value satisfying the color deviation as a representative color of the image, and may use the representative color of the image to display information related to the image.

Figure 2:
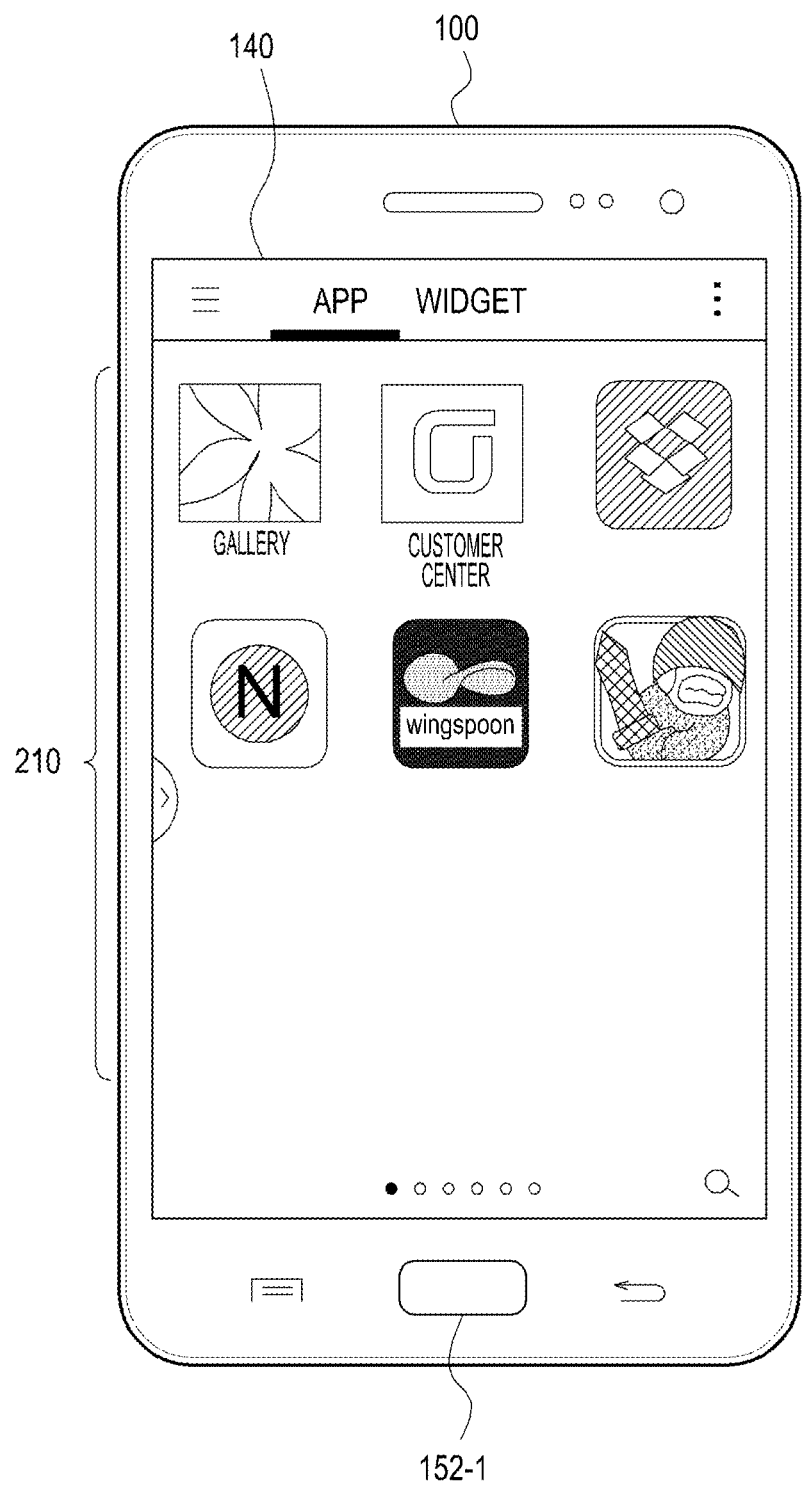
FIG. 2 illustrates application icons displayed in an electronic device according to an embodiment of the present disclosure.

FIG. 2 illustrates application icons displayed in an electronic device according to an embodiment of the present disclosure.

Referring to FIG. 2, the electronic device 100 may display at least one or more application icons 210 on a display unit 140. According to an embodiment of the present disclosure, when an icon is touched on the display unit 140, the icon at the touched point may be selected, and an icon may also be selected through manipulation of a home button 152-1. When a user selects one of the at least one or more application icons 210, the electronic device 100 may display a screen of an application corresponding to the selected icon.

According to various embodiments of the present disclosure, each of the application icons 210 may be an image designed to have various colors.

FIGS. 3A, 3B, 3C, and 3D illustrate types of application icons according to an embodiment of the present disclosure.

Referring to FIG. 3A, a background color 311 of an application icon may be monochromatic blue, and a logo 312, a central object of the application icon, may be monochromatic white with high visibility.

Referring to FIG. 3B, a background color 321 of an application icon may be white, and a logo 322, a central object of the application icon, may be blue.

Referring to FIG. 3C, a background color 331 of an application icon may be black, and a logo 332, a central object of the application icon, may be orange.

Referring to FIG. 3D, a background color 341 of an application icon may be polychromatic but not monochromatic, and the application icon may contain an object (i.e., character) 342 having various colors.

In addition to the aforementioned examples, according to various embodiments of the present disclosure, each of the application icons 210 may be an image configured with various background colors, and various colors of objects. Various colors may be extracted from the application icon configured with various background colors, and various colors of objects. For example, blue, white, or an average color of blue and white may be extracted from the application icon illustrated in FIG. 3A, and white, blue, gray, or an average color of white, blue, and gray may be extracted from the application icon illustrated in FIG. 3B. Black, orange, or an average color of black and orange may be extracted from the application icon illustrated in FIG. 3C, and the background color, the character color, or an average color of the background color and the character color may be extracted from the application icon illustrated in FIG. 3D. The colors extracted from the respective application icons may be cloudy and dull, or fine and clear.

FIG. 4 illustrates a first color extracted from an application icon according to an embodiment of the present disclosure, and FIG. 5 illustrates a second color extracted from an application icon according to an embodiment of the present disclosure.

First, referring to FIG. 4, a color extracted from an application icon may be a cloudy and dull color having an RGB triplet (i.e., 40, 50, 45) as a first color 410 illustrated in FIG. 4. In this case, a difference between the R-component value and the G-component value is 10, a difference between the G-component value and the B-component value is 15, and a difference between the R-component value and the B-component value is 5. For the cloudy and dull color, the difference between the R-, G-, and B-component values is more likely to be low.

Thereafter, referring to FIG. 5, a color extracted from an application icon may be a fine and clear color having an RGB triplet (i.e., 20, 125, 160) as a second color 510 illustrated in FIG. 5. In this case, a difference between the R-component value and the G-component value is 105, a difference between the G-component value and the B-component value is 35, and a difference between the R-component value and the B-component value is 140. For the fine and clear color, the difference between the R-, G-, and B-component values is more likely to be high.

Figure 6:
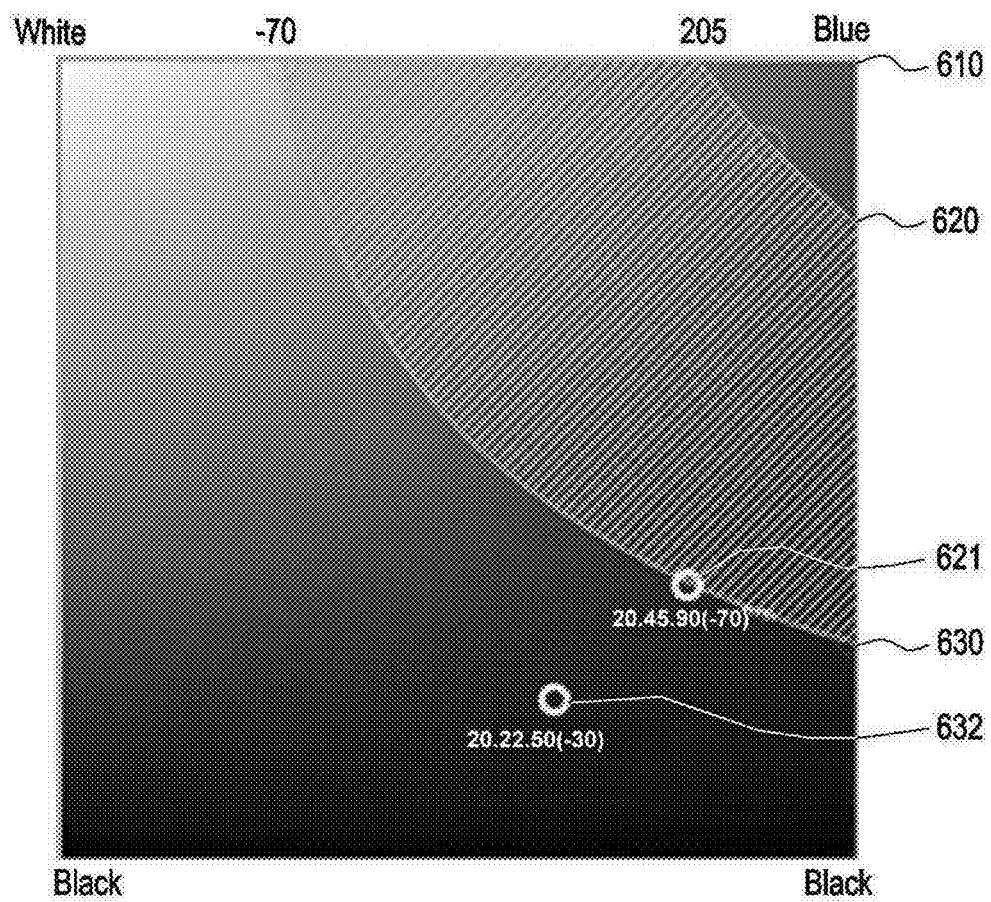
FIG. 6 illustrates determining a color in which a difference between minimum and maximum values of R-, G-, and B- component values is greater than a certain value, according to an embodiment of the present disclosure.

FIG. 6 illustrates determining a color in which a difference between minimum and maximum values of R-, G-, and B- component values is greater than a certain value according to an embodiment of the present disclosure.

Referring to FIG. 6, reference numeral 610 denotes a location where a blue color has a maximum color value of 225. Reference numeral 620 denotes a first curve containing color values for which a difference between minimum and maximum values of R-, G-, and B-component values is maximum with respect to the location denoted by reference numeral 610. Reference numeral 630 denotes a second curve containing color values for which a difference between minimum and maximum values of R-, G-, and B-component values is 70. For example, the second curve 630 may contain an RGB triplet (i.e., 20, 45, 90) 621 in which a difference between minimum and maximum values of R-, G-, and B-component values is −70. Color values for which a difference between minimum and maximum values of R-, G-, and B-component values is more than −70 may be contained in an area between the first and second curves 620 and 630. Color values for which a difference between minimum and maximum values of R-, G-, and B-component values is less than −70 may be contained in an area below the second curve 630. For example, an RGB triplet (i.e., 20, 22, 50) 632 may be contained in the area below the second curve 630, in which a difference between minimum and maximum values of R-, G-, and B-component values is −30.

In various embodiments of the present disclosure, using such characteristics, it may be determined that the corresponding color is cloudy and dull when a difference between R-, G-, and B-component values thereof is less than a certain value (for example, 70).

According to an embodiment of the present disclosure, a method of extracting a color in an electronic device may include extracting at least one or more color values from an image, and extracting a color value satisfying a color deviation from the extracted color values. According to an embodiment of the present disclosure, the image may be an application icon. According to an embodiment of the present disclosure, the extracting of the at least one or more color values may include extracting at least one or more dominant color values from the image, and extracting at least one or more object color values from the image. According to an embodiment of the present disclosure, the method may further include selecting a certain number of color values in a descending order of area from the at least one or more extracted dominant color values and the at least one or more extracted object color values.

According to an embodiment of the present disclosure, the color deviation may be a difference between maximum and minimum values of R-, G-, and B-component values. According to an embodiment of the present disclosure, as a difference between maximum and minimum values of R-, G-, and B-component values, the color deviation may be a value of 70. According to an embodiment of the present disclosure, the method may further include extracting an average color value using the color values when there is no color value satisfying the color deviation. According to an embodiment of the present disclosure, the method may further include determining the extracted color value satisfying the range of the color deviation as a representative color of the image, and using the representative color of the image to display information related to the image.

Figure 7:
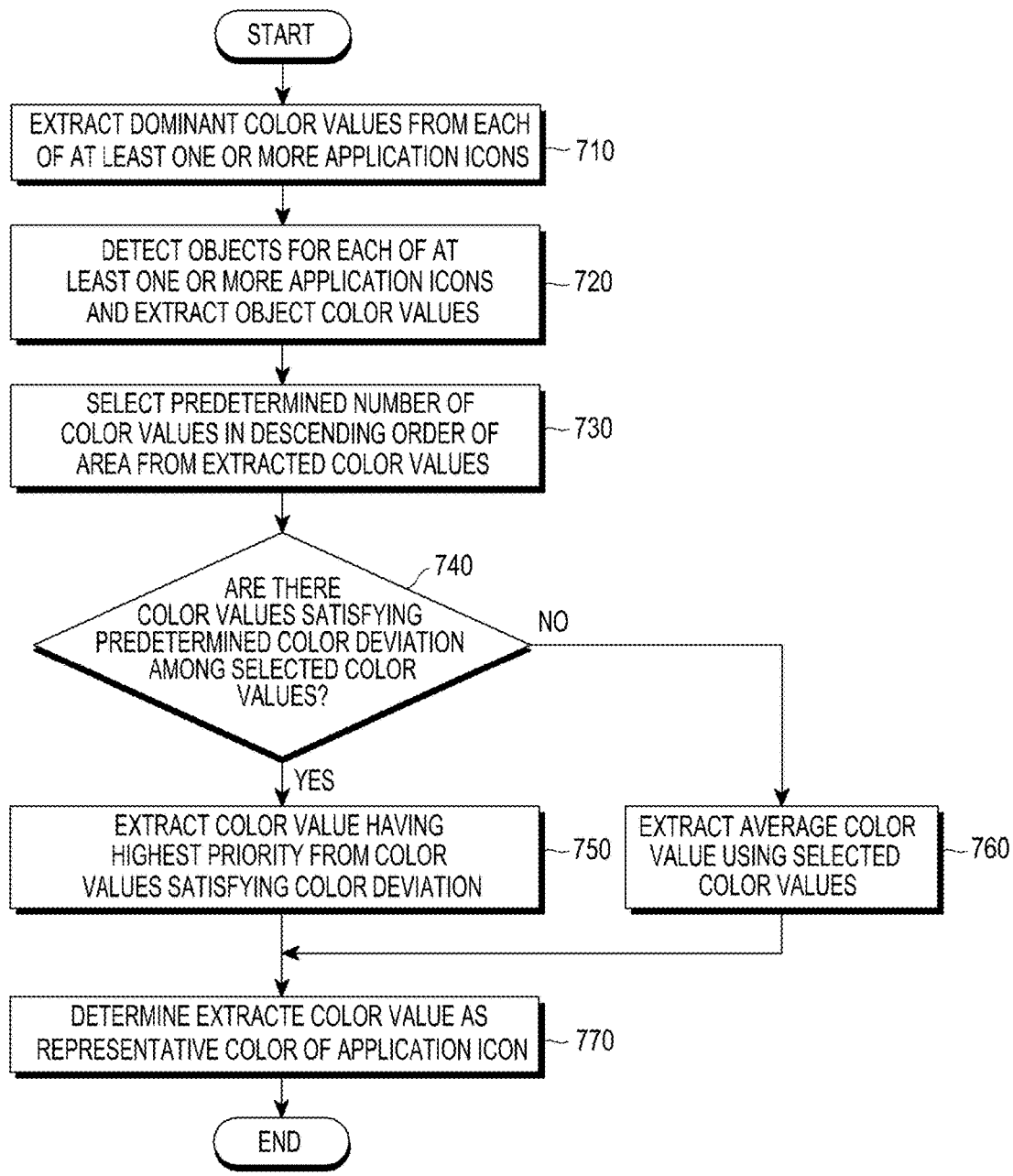
FIG. 7 is a flowchart illustrating an operation of extracting a color in an electronic device according to an embodiment of the present disclosure.

FIG. 7 is a flowchart illustrating an operation of extracting a color in an electronic device according to an embodiment of the present disclosure.

Referring to FIG. 7, the electronic device 100 may extract dominant color values from each of at least one or more application icons in operation 710. According to an embodiment of the present disclosure, the electronic device 100 may extract all color values contained in the application icons.

In operation 720, the electronic device 100 may detect at least one or more objects for each of the application icons and extract color values of the at least one or more detected objects. According to an embodiment of the present disclosure, the objects may include a character, a diagram, and text contained in the application icon. According to an embodiment of the present disclosure, the electronic device 100 may detect an edge value in the application icon, detect an object using the edge value, and extract a color value of the object.

In operation 730, the electronic device 100 may select a certain number of color values from the extracted dominant color values and the extracted object color values in a descending order of area. According to an embodiment of the present disclosure, the electronic device 100 may select a certain number of color values, for example less than 10 color values, from the extracted dominant color values and the extracted object color values in a descending order of area occupied by the color values within the application icon. At this time, the certain number may be determined as a different value.

In operation 740, the electronic device 100 may determine whether, among the selected color values, there are color values satisfying a color deviation. According to an embodiment of the present disclosure, the electronic device 100 may determine whether, among the selected color values, there are color values for which a difference between minimum and maximum values of R-, G-, and B-component values is more than the color deviation, for example, 70.

If there are no color values satisfying the color deviation, the electronic device 100 may extract an average color value using the selected color values in operation 760.

If there are color values satisfying the color deviation, the electronic device 100 may extract a color value having the highest priority from the color values satisfying the color deviation in operation 750. According to an embodiment of the present disclosure, the electronic device 100 may extract a color value occupying the largest area within the application icon as the color value having the highest priority among the color values satisfying the color deviation.

In operation 770, the electronic device 100 may determine the extracted color value as a representative color. According to an embodiment of the present disclosure, the electronic device 100, when the average color value is extracted, may determine the average color value as the representative color of the application icon. According to an embodiment of the present disclosure, when the color value having the highest priority is extracted from the color values satisfying the color deviation, the electronic device 100 may determine the corresponding color value as the representative color of the application icon.

Figure 8:
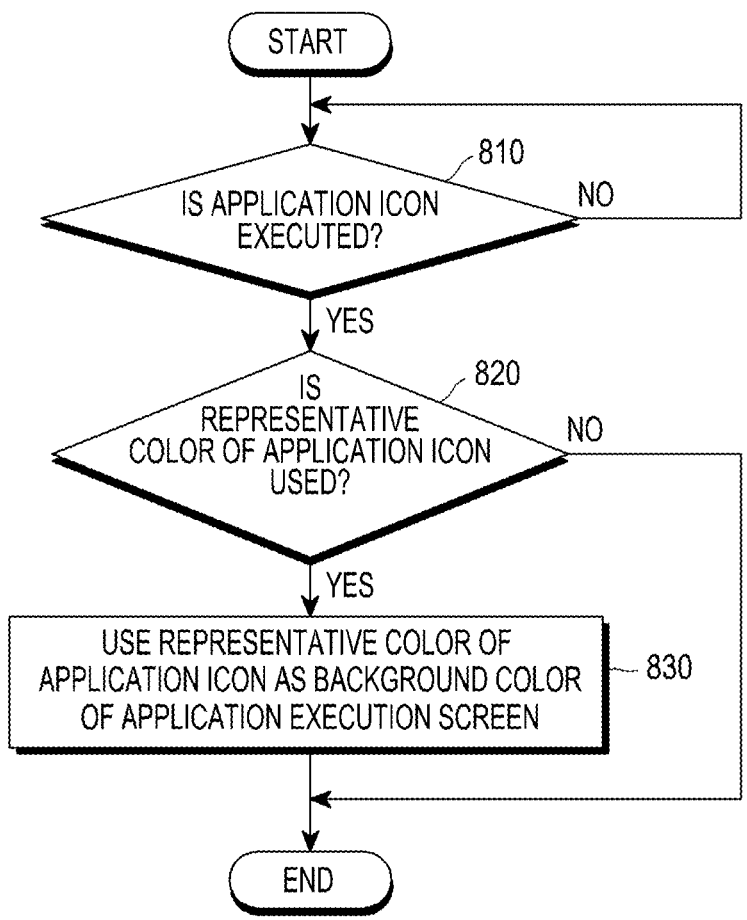
FIG. 8 is a flowchart illustrating an operation of using an extracted color in an electronic device according to an embodiment of the present disclosure.

According to an embodiment of the present disclosure, the representative color of the application icon may be used to display information associated with the corresponding application. FIG. 8 is a flowchart illustrating an operation of using the extracted color in an electronic device according to an embodiment of the present disclosure.

Referring to FIG. 8, the electronic device 100 may determine whether an application icon is executed, in operation 810. According to an embodiment of the present disclosure, when one of application icons displayed on a display unit 140 is selected, the electronic device 100 may execute the corresponding application.

When the application icon is executed, the electronic device 100 may determine whether to use a representative color of the application icon, in operation 820. According to an embodiment of the present disclosure, when the representative color of the executed application icon has been extracted, the electronic device 100 may determine whether to use the representative color of the application icon.

When the representative color of the application icon is determined to be used, the electronic device 100 may use the representative color of the application icon as a background color of an application execution screen in operation 830. According to another embodiment, the representative color of the application icon may also be used as the color of a widget related to the application, or may also be used for a partial area of the application execution screen.

Figure 9A:
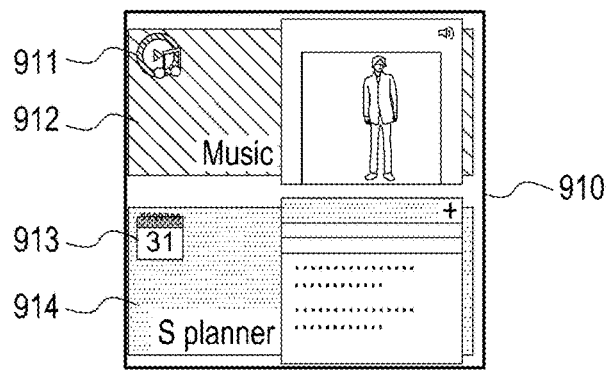
FIGS. 9A, 9B, and 9C illustrate a screen for which an extracted color is used in an electronic device according to an embodiment of the present disclosure.
Figure 9B:
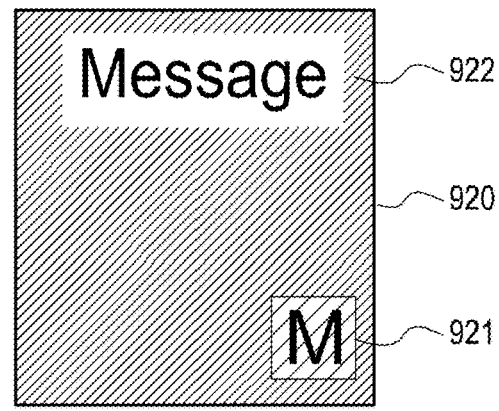
Figure 9C:
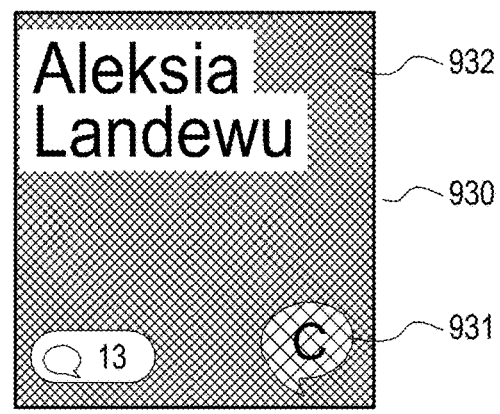

FIGS. 9A, 9B, and 9C illustrate examples of a screen for which an extracted color is used in an electronic device according to an embodiment of the present disclosure.

Referring to FIG. 9A, when a first application icon 911 and a second application icon 913 are displayed on a widget screen 910, a representative color of the first application icon 911 may be displayed as the background color 912 of the first application icon 911, and a representative color of the second application icon 913 may be displayed as the background color 914 of the second application icon 913. Furthermore, referring to FIG. 9B, a representative color of a third application icon 921 may be displayed as the background color 922 of an application execution screen 920. In addition, referring to FIG. 9C, a representative color of a fourth application icon 931 may be displayed as the background color 932 of an application execution screen 930.

According to various embodiments of the present disclosure, the most representative and important color, which is more vivid, can be extracted from an image (e.g., an icon) displaying an application in an electronic device. According to various embodiments of the present disclosure, a color with good color formation and without a sense of difference in the entire design can be extracted from an image (e.g., an icon) displaying an application in an electronic device. Moreover, according to various embodiments of the present disclosure, the color extracted from the image (e.g., icon) displaying the application in the electronic device can be used to display information associated with the corresponding application, thereby providing a more intuitive and efficient graphic environment.

The methods according to the various embodiments of the present disclosure may be in a form of program instructions executed through various computer means to be recorded in a computer readable medium. The computer readable medium may include a program command, a data file, a data structure, and the like independently or in combination. The program instructions recorded in the medium may be specially designed and configured for the present disclosure, or may be known to and usable by those skilled in the field of computer software.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Furthermore, the mobile electronic device according to the various embodiments of the present disclosure may receive and store the program from a program providing device connected thereto in a wired or wireless manner. The program providing device may include a memory that stores a program including instructions for performing the photographing method according to various embodiments of the present disclosure, a communication unit that performs wired or wireless communication with the electronic device, and a controller that controls the corresponding program to be transmitted through the communication unit at the request of the electronic device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of extracting a color in an electronic device, the method comprising:
    extracting a plurality of colors, each of which is represented by an RGB triplet having an R value, a G value, and a B value, from an icon image;
    selecting a predetermined number of colors from the extracted a plurality of colors based on a portion occupied by each of the plurality of colors within the icon image;
    determining at least one color, among the predetermined number of colors, having an R value, a G value, and a B value satisfying a range of color deviation, wherein the color deviation comprises a difference between a maximum of the R, G and B values and a minimum of the R, G and B values determined in advance;
    extracting a color from the at least one color based on a priority;
    determining the extracted color as a representative color of the icon image; and
    displaying the representative color as a background color of a screen of an application related to the icon image.

2. The method of claim 1, wherein the plurality of colors comprises dominant colors of the icon image, and object colors from the icon image.

3. The method of claim 2, further comprising: selecting the predetermined number of colors from the extracted dominant colors and the extracted object colors.

4. The method of claim 3, wherein the predetermined number of colors are selected in a descending order of area from the dominant colors and the object colors.

5. The method of claim 1, wherein the color deviation is a numerical value corresponding to the difference.

6. The method of claim 1, further comprising:
    extracting an average color using the plurality of colors.

7. The method of claim 1, further comprising extracting a color having a highest priority from the at least one color based on a size of a portion occupied by the at least one color within the icon image.

8. An electronic device comprising:
    a display unit configured to display an icon image; and
    at least one processor configured to:
        extract a plurality of colors, each of which is represented by an RGB triplet having an R value, a G value, and a B value, from the icon image,
        select a predetermined number of colors from the extracted plurality of colors based on a portion occupied by each of the plurality of colors within the icon image,
        determine at least one color, from among the predetermined number of colors, having an R value, a G value, and a B value satisfying a range of color deviation, wherein the color deviation comprises a difference between a maximum of the R, G and B values and a minimum of the R, G and B values determined in advance,
        extract a color from the at least one color based on a priority,
        determine the extracted color as a representative color of the icon image, and
        display the representative color as a background color of a screen of an application related to the icon image.

9. The electronic device of claim 8, wherein the plurality of colors comprises dominant colors of the icon image and object colors in the icon image.

10. The electronic device of claim 9, wherein the at least one processor is further configured to select the predetermined number of colors from the extracted dominant colors and the extracted object colors.

11. The electronic device of claim 10, wherein the at least one processor is further configured to select the color in a descending order of area from the extracted dominant color and the extracted object color.

12. The electronic device of claim 8, wherein the color deviation comprises a numerical value corresponding to the difference.

13. The electronic device of claim 8, wherein the at least one processor is further configured to extract an average color using the plurality of colors.

14. The electronic device of claim 8, wherein the at least one processor is further configured to extract a color having a highest priority from the at least one color based on a size of a portion occupied by the at least one color within the icon image.

15. A non-transitory computer-readable storage medium with an executable computer program stored thereon, wherein the computer program instructs at least one processor to perform operations for:
- extracting a plurality of colors, each of which is represented by an RGB triplet having an R value, a G value, and a B value, from an icon image;
- selecting a predetermined number of colors from the extracted a plurality of colors based on a portion occupied by each of the plurality of colors within the icon image;
- determining at least one color, among the predetermined number of colors, having an R value, a G value, and a B value satisfying a range of color deviation, wherein the color deviation comprises a difference between a maximum of the R, G and B values and a minimum of the R, G and B values determined in advance;
- extracting a color from the at least one color based on a priority;
- determining the extracted color as a representative color of the icon image; and
- displaying the representative color as a background color of a screen of an application related to the icon image.

* * * * *